United States Patent
Kumar et al.

(10) Patent No.: US 11,186,172 B1
(45) Date of Patent: Nov. 30, 2021

(54) VEHICLE ALL-WHEEL DRIVE CONTROL SYSTEM

(71) Applicant: FORD GLOBAL TECHNOLOGIES, LLC, Dearborn, MI (US)

(72) Inventors: Abhinav Kumar, Canton, MI (US); Nicholas McCubbin, Northville, MI (US); Vladimir Ivanovic, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/119,203

(22) Filed: Dec. 11, 2020

(51) Int. Cl.
*B60K 23/08* (2006.01)
*B60K 17/02* (2006.01)
*B60K 17/348* (2006.01)

(52) U.S. Cl.
CPC .......... *B60K 23/0808* (2013.01); *B60K 17/02* (2013.01); *B60K 17/348* (2013.01); *B60K 2023/085* (2013.01)

(58) Field of Classification Search
CPC .. B60K 23/0808; B60K 17/348; B60K 17/02; B60K 2023/085
See application file for complete search history.

(56) References Cited

U.S. PATENT DOCUMENTS

| | | | |
|---|---|---|---|
| 2015/0019094 A1 | 1/2015 | Larkin et al. | |
| 2016/0236568 A1* | 8/2016 | Quehenberger | B60W 30/18172 |
| 2016/0280064 A1* | 9/2016 | Nozu | F16D 25/10 |
| 2017/0326976 A1 | 11/2017 | Burt et al. | |
| 2018/0111479 A1 | 4/2018 | Grutter et al. | |
| 2020/0031225 A1* | 1/2020 | Watanabe | B60K 17/3515 |

* cited by examiner

*Primary Examiner* — Justin Holmes
(74) *Attorney, Agent, or Firm* — Vincent Mastrogiacomo; Brooks Kushman P.C.

(57) ABSTRACT

A vehicle includes a first axle, a second axle, a driveshaft, a first clutch, a second clutch, a third clutch, and a controller. The second axle has first and second half shafts. The second axle has first and second wheels. The driveshaft is disposed between the first and second axles and is coupled to the second axle. The first clutch is configured to selectively couple the driveshaft to the first axle. The second clutch is configured to selectively couple the first wheel to the first half shaft. The third clutch is configured to selectively couple the second wheel to the second half shaft. The controller is programmed to control the clutches to connect the second axle to the first axle via the driveshaft.

20 Claims, 4 Drawing Sheets

VEHICLE ALL-WHEEL DRIVE CONTROL SYSTEM

TECHNICAL FIELD

The present disclosure relates to control systems for all-wheel drive vehicles.

BACKGROUND

Vehicles may include all-wheel drive systems that are designed to improve vehicle maneuverability and decrease driver discomfort.

SUMMARY

A vehicle includes a first axle, a second axle, a driveshaft, and a controller. The first axle has a first differential and first clutch. The first differential includes first and second output shafts coupled to first and second wheels, respectively. The second axle has a second differential, a second clutch, and a third clutch. The second differential includes third and fourth output shafts coupled to third and fourth wheels, respectively. The second clutch is configured to couple and decouple the third wheel to and from the third output shaft. The third clutch is configured to couple and decouple the fourth wheel to and from the fourth output shaft. The driveshaft is selectively coupled to a carrier of the first differential by the first clutch and is coupled to a carrier of the second differential via a fixed gearing arrangement. The controller is programmed to, in response to a command to connect the first axle to the second axle via the driveshaft and a speed of the third wheel being greater than a speed of the fourth wheel such that a difference between the speeds of the third and fourth wheels exceeds a threshold, close the second clutch to transfer loads from the second axle to the driveshaft to increase a speed of the driveshaft and close the first clutch subsequent to closing the second clutch.

A vehicle includes a first axle, a second axle, a driveshaft, a first clutch, a second clutch, a third clutch, and a controller. The first axle has first and second output shafts. The first axle has first and second wheels. The second axle has third and fourth output shafts. The second axle has third and fourth wheels. The driveshaft is selectively coupled to the first axle via the first clutch and is coupled to the second axle via a fixed gearing arrangement. The second clutch is configured to couple and decouple the third wheel to and from the third output shaft. The third clutch is configured to couple and decouple the fourth wheel to and from the fourth output shaft. The controller is programmed to, in response to a command to connect the first axle to the second axle via the driveshaft and a speed of the third wheel being greater than a speed of the fourth wheel, close the second clutch to transfer loads from the second axle to the driveshaft to increase a speed of the driveshaft and close the first clutch subsequent to closing the second clutch.

A vehicle includes a first axle, a second axle, a driveshaft, a first clutch, a second clutch, a third clutch, and a controller. The second axle has first and second half shafts. The second axle has first and second wheels. The driveshaft is disposed between the first and second axles and is coupled to the second axle. The first clutch is configured to selectively couple the driveshaft to the first axle. The second clutch is configured to selectively couple the first wheel to the first half shaft. The third clutch is configured to selectively couple the second wheel to the second half shaft. The controller is programmed to, in response to a first command to connect the first axle to the second axle via the driveshaft and a speed of the first wheel being greater than a speed of the second wheel, close the second clutch to transfer loads from the second axle to the driveshaft to increase a speed of the driveshaft and close the first clutch subsequent to closing the second clutch. The controller is further programmed to, in response to a second command to connect the first axle to the second axle via the driveshaft and a speed of the second wheel being greater than a speed of the first wheel, close the third clutch to transfer loads from the second axle to the driveshaft to increase a speed of the driveshaft and close the first clutch subsequent to closing the third clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
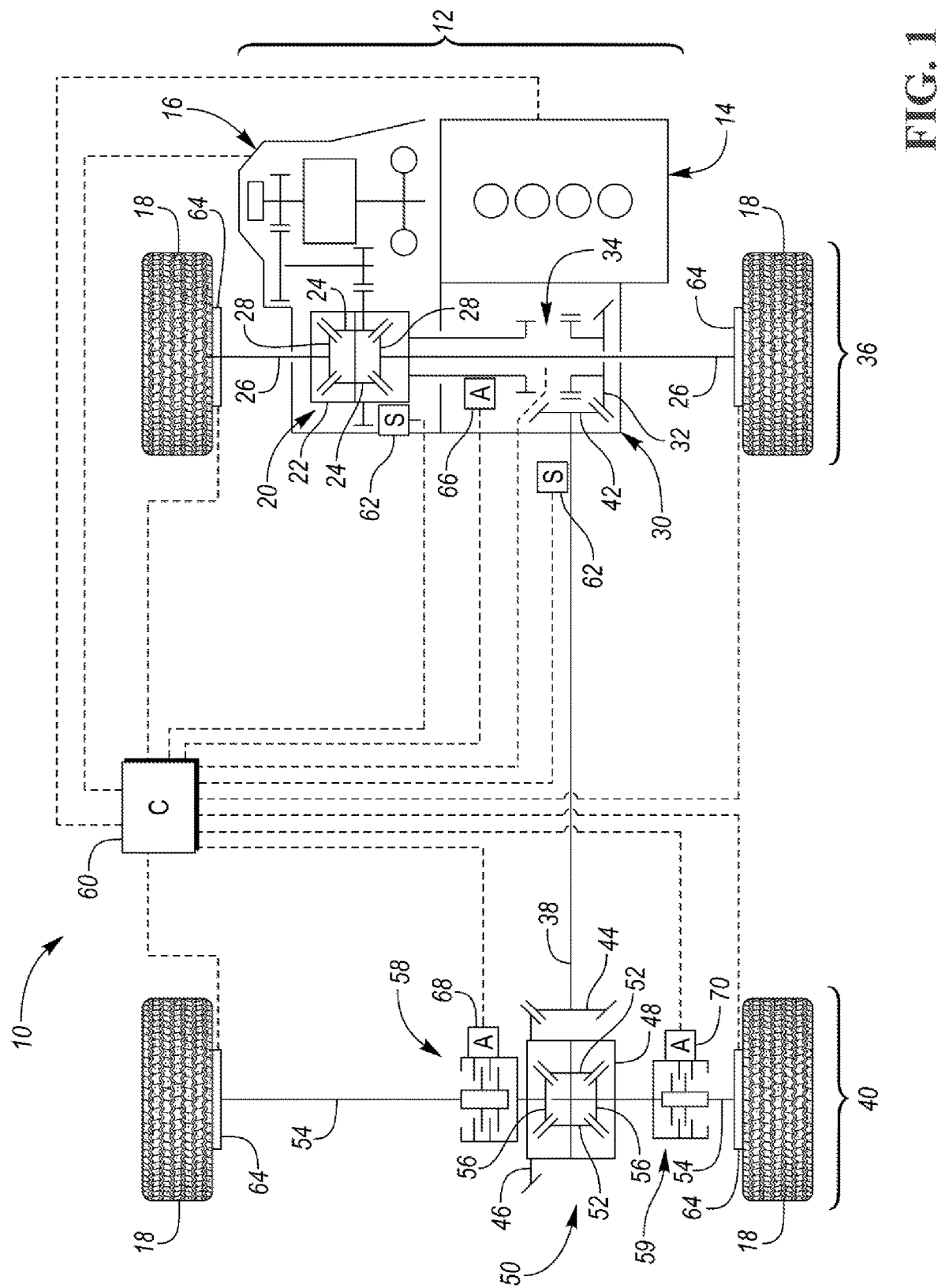
FIG. 1 is a schematic illustration of a representative vehicle and a representative vehicle powertrain.

Referring to FIG. 1, a schematic diagram representative of a vehicle 10 and a vehicle powertrain 12 is illustrated. The vehicle 10 may be an all-wheel-drive (AWD) vehicle where the powertrain 12 is capable of delivering power to all of the vehicle's wheels, whether full-time or on-demand. The powertrain 12 includes prime movers or power generating components (i.e., engines or electric motors) and the drivetrain. The drivetrain is the group of components that deliver power to the drive wheels, excluding the power generating components. In contrast, the powertrain 12 is considered to include both the power generating components and the drivetrain. The powertrain 12 includes an engine 14 and a transmission 16. The powertrain 12 may alternatively, or in addition to the engine 14, include an electric motor as a prime mover. If an electric motor is used as an alternative to the engine 14 it should be construed to perform all the functions of the engine 14 as described herein. The transmission 16 may include gearing arrangements configured to provide multiple gear ratios between an input and an output of the transmission 16. The engine 14 is connected to the input of the transmission 16 while drivetrain components that are configured to deliver power to drive wheels 18 are connected to outputs of the transmission 16. The engine 14 may be connected to the input of the transmission by a torque converter or a launch clutch.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches. A clutch that holds an element against rotation by selectively connecting the element to a fixed component, such as a transmission housing, may be called a brake.

The transmission 16 may be a transaxle that includes both gearing elements that provide multiple gear ratios between an input and an output of the transmission 16 and a differential, which may be referred to as the front axle differential 20. The front axle differential 20 may comprise the output of the transmission 16. The front axle differential 20 includes a carrier 22, spider (or bevel) gears 24 that are rotatably coupled to the carrier 22, and output (or half) shafts 26 that include bevel gears 28 that mesh with the spider gears 24. The output shafts 26 are each fixedly coupled to a drive wheel 18. The vehicle 10 may also include a power transfer unit (PTU) 30. The PTU 30 may also be referred to as a power takeoff unit. The PTU 30 may include a ring gear 32 that is selectively coupled to the carrier 22 by power transfer unit clutch (PTU clutch) 34. The PTU clutch 34 may be a dog clutch. Collectively, the front axle differential 20 (including the carrier 22, spider gears 24, output shafts 26, bevel gears 28, etc.) and the PTU 30 (including the ring gear 32 and PTU clutch 34) may be referred to as the front axle 36. The front axle 36 may or may not also include the drive wheels 18 that are fixedly coupled to the output shafts 26. The output shafts 26 and the carrier 22 may all act as outputs of the front axle 36. The engine 14 (or other prime mover) may be configured to generate and transfer power and/or torque to the front axle 36.

A driveshaft 38 may be configured to couple the front axle 36 to a rear axle 40 (or rear drive unit). Driveshaft 38 may also be referred to as the propshaft. More specifically, the driveshaft 38 may include a first bevel gear 42 that meshes with the ring gear 32 in the PTU 30 and a second bevel gear 44 that meshes with a ring gear 46 that is affixed to a carrier 48 of a rear axle differential 50. The rear axle differential 50 also includes spider (or bevel) gears 52 that are rotatably coupled to the carrier 48, and output (or half) shafts 54 that include bevel gears 56 that mesh with the spider gears 52. The output shafts 54 are each fixedly coupled to a drive wheel 18. One of the half shafts 54 includes a first rear drive unit (RDU) clutch 58 that is configured to couple and decouple one of the drive wheels 18 from the rear axle differential 50. The other of the half shafts 54 includes a second RDU clutch 59 that is configured to couple and decouple the other of the drive wheels 18 from the rear axle differential 50. The first RDU clutch 58 and the second RDU clutch 59 may be friction type clutches that consist of alternatively friction plates and separator plates that are connected to opposing rotating components, such as shafts or drums. Collectively, the rear axle differential 50 (including the ring gear 46, carrier 48, spider gears 52, output shafts 54, bevel gears 56, etc.), the first RDU clutch 58, and second RDU clutch 59 may be referred to as the rear axle 40. The rear axle 40 may or may not also include the drive wheels 18 that are fixedly coupled to the output shafts 54. Collectively, the rear axle differential 50 (including the ring gear 46, carrier 48, spider gears 52, output shafts 54, bevel gears 56, etc.), the first RDU clutch 58, and second RDU clutch 59, excluding the drive wheels 18, may be referred to as the rear drive unit (RDU). When the PTU clutch 34 and the first RDU clutch 58 and/or the second RDU clutch 59 are in closed positions power and/or torque that is generated by the engine 14 is transferred from the front axle 36 to the rear axle 40 via the driveshaft 38.

When the PTU clutch 34, the first RDU clutch 58, and the second RDU clutch 59 are in open positions such that the ring gear 32 is decoupled from the carrier 22 and the drive wheels 18 on the rear axle 40 are decoupled from the rear axle differential 50, parasitic losses within the driveline may be decreased because specific components will cease rotating. Specifically, when the PTU clutch 34, the first RDU clutch 58, and the second RDU clutch 59 are in open positions the ring gear 32, driveshaft 38 and carrier 48 of the rear axle differential 50 will all cease to rotate decreasing parasitic losses and increasing the overall fuel economy of the vehicle 10.

The vehicle 10 further includes an associated controller 60 such as a powertrain control unit (PCU). While illustrated as one controller, the controller 60 may be part of a larger control system and may be controlled by various other controllers throughout the vehicle 10, such as a vehicle system controller (VSC). It should therefore be understood that the controller 60 and one or more other controllers can collectively be referred to as a "controller" that controls various actuators in response to signals from various sensors to control functions of various components.

The controller 60 may be configured to receive signals indicative of the speeds of the opposing sides (input and output sides) of the PTU clutch 34. The speed differential between the opposing sides of the PTU clutch 34 may be referred to as the slip speed of the PTU clutch 34. The controller 60 may receive the signals from speed sensors 62 that are configured to determine the rotational speeds of the opposing sides of the PTU clutch 34. One speed sensor 62 may be configured to measure the speed of the driveshaft 38 while the other is configured to measure the speed of the carrier 22 the front axle differential 20 in order to determine the rotational speeds of the opposing sides of the PTU clutch 34. Alternatively, the speed sensors 62 may be located on other rotating components that are on opposing sides of the PTU clutch 34, respectively. For example, one of the speed sensors 62 may be located directly on the input of the PTU clutch 34 while the other speed sensor is located on the ring gear 32.

The controller 60 may be configured to control the power, torque, and/or speed output of the engine 14 (or other prime movers such as electric motors in electric or hybrid vehicles) based on an accelerator and/or a brake pedal input or any other state or condition that may require an adjustment of the power, torque, and/or speed output of the engine 14 (or other prime mover). The controller 60 may further be configured to control various functions of the transmission 16, such as shifting, based on various inputs including accelerator and/or brake pedal input, a regenerative braking request (in vehicles that include electric generators configured to recharge a battery), other operator inputs (such as changing the position of a transmission gear selector), etc.

The controller 60 may be configured to control friction brakes 64 (or actuators thereof) based on input from the brake pedal or another state or condition of the vehicle 10 that may require braking. Additionally, the controller 60 may be configured to control the PTU clutch 34 (or an actuator 66 of the PTU clutch), the first RDU clutch 58 (or an actuator 68 of the first RDU clutch 58), and the second RDU clutch 59 (or an actuator 70 of the second RDU clutch 59). The actuator 66 of the PTU clutch 34, the actuator 68 of the first RDU clutch 58, and/or the actuator 70 of the second RDU clutch 59 may be electric motors (such as servo motors), electric solenoids, valves connected to hydraulic cylinders, valves connected to pneumatic cylinders, or any other actuator known in the art. More specifically, the controller 60 may be configured to open the PTU clutch 34, the first RDU clutch 58, and second RDU clutch 59 based on a need to decrease parasitic losses and increased fuel economy. Alternatively, the controller 60 may be configured to close both the PTU clutch 34, the first RDU clutch 58, and the second RDU clutch 59 based on a need to provide power to the drive wheels 18 of both the front axle 36 and rear axle 40.

The controller 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10.

Control logic or functions performed by the controller 60 may be represented by flow charts, graphs, or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, transmission, transaxle, and/or powertrain controller, such as controller 60. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 60 may be configured to receive various states or conditions of the various vehicle components illustrated in FIG. 1 via electrical signals. The electrical signals may be delivered to the controller 60 from the various components via input channels. Additionally, the electrical signals received from the various components may be indicative of a request or a command to change or alter a state of one or more of the respective components of the vehicle 10. The controller 60 includes output channels that are configured to deliver requests or commands (via electrical signals) to the various vehicle components. The controller 60 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described in FIG. 1 is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The PTU clutch 34 and either the first RDU clutch 58 or the second RDU clutch 59 may be utilized to connect the rear axle 40 to the front axle 36 via driveshaft 38. Either the first RDU clutch 58 or the second RDU clutch 59 is closed to increase the speed of driveshaft 38, which in turn decreases a slip speed across the PTU clutch 34. If both the first RDU clutch 58 and the second RDU clutch 59 are simultaneously used to control the slip speed across the PTU clutch 34 when connecting the rear axle 40 to the front axle 36, it may result in overshooting the torque on the front axle, which could be detrimental and lead to damaging the components on the front axle 36, such as the PTU clutch 34. That is why it is preferable to utilized only one of the first RDU clutch 58 or the second RDU clutch 59 when connecting the rear axle 40 to the front axle 36 via driveshaft 38.

Once the slip speed across the PTU clutch 34 reaches a desired value or is within a desired range (e.g., once the slip across the PTU clutch 34 is less than a threshold) after closing one of the first RDU clutch 58 or the second RDU clutch 59, the PTU clutch 34 closes to connect the rear axle 40 to the front axle 36, so that power and torque can be transferred from the front axle 36, or more specifically, so that power and torque can be transferred from the engine 14 (or other powerplant), to the rear axle 40.

When the vehicle 10 is traveling over a curved road surface such that the vehicle 10 is turning, it may be desirable to close the RDU clutch (i.e., either the first RDU clutch 58 or the second RDU clutch 59) that is connected to the wheel 18 on the rear axle 40 that is moving at a speed that will bring the slip speed across the PTU clutch 34 to a value that is closer to a desired value or range when connecting the rear axle 40 to the front axle 36 via driveshaft 38. More specifically, when the vehicle 10 is traveling over a curved road surface such that the vehicle 10 is turning, it may be desirable to close the RDU clutch (i.e., either the first RDU clutch 58 or the second RDU clutch 59) that will decrease the slip speed across the PTU clutch 34 within a shorter period of time (e.g., the RDU clutch that is connected to the wheel 18 of the rear axle 40 that is on the outer radius of the curved road surface since it will be spinning faster than the wheel 18 of the rear axle 40 that is on the inner radius of the curved road surface).

Figure 3:
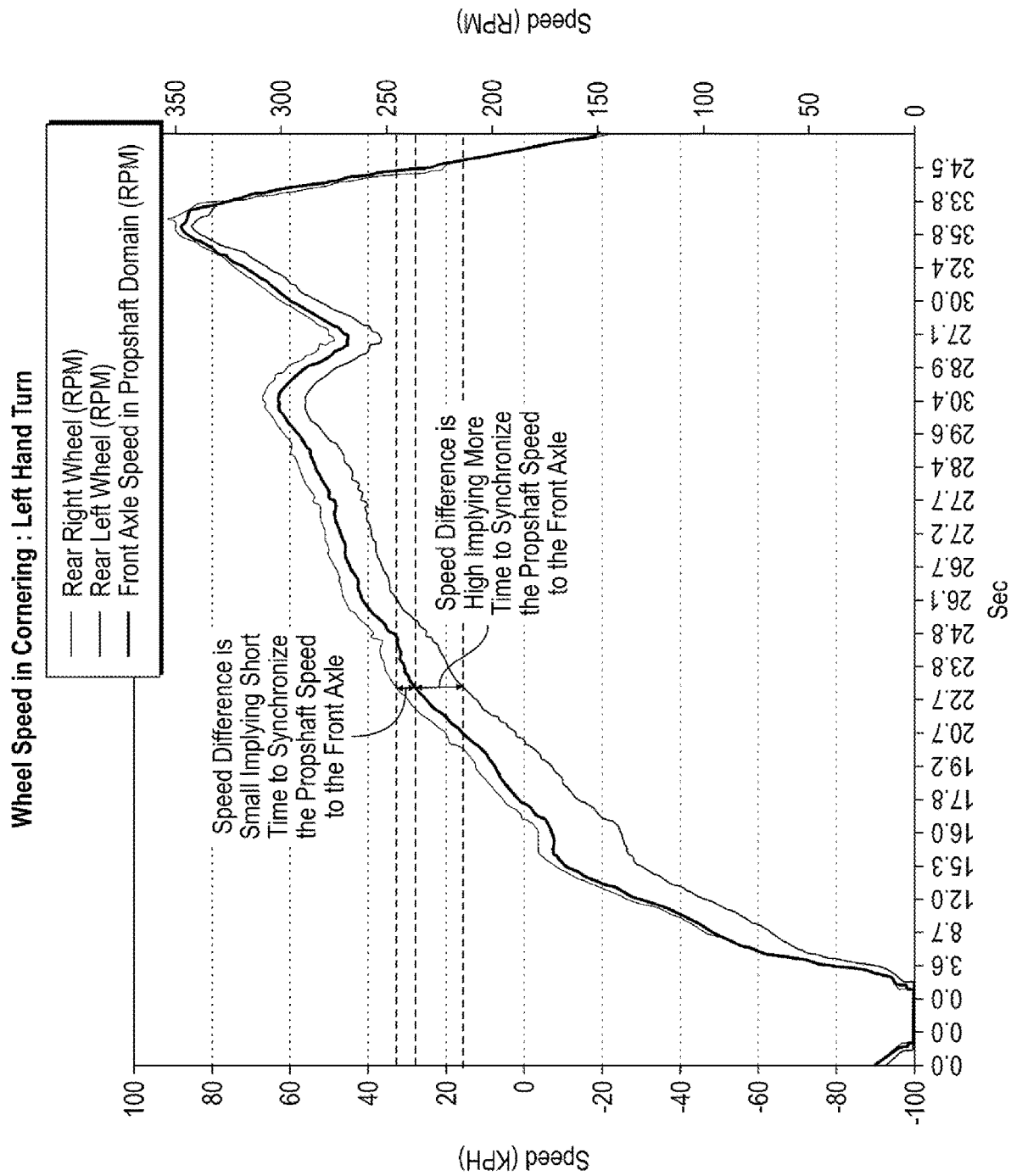
FIG. 3 is a series of graphs illustrating the speed differences between the wheels on the rear axle and the front axle at the propshaft during a left turn.
Figure 4:
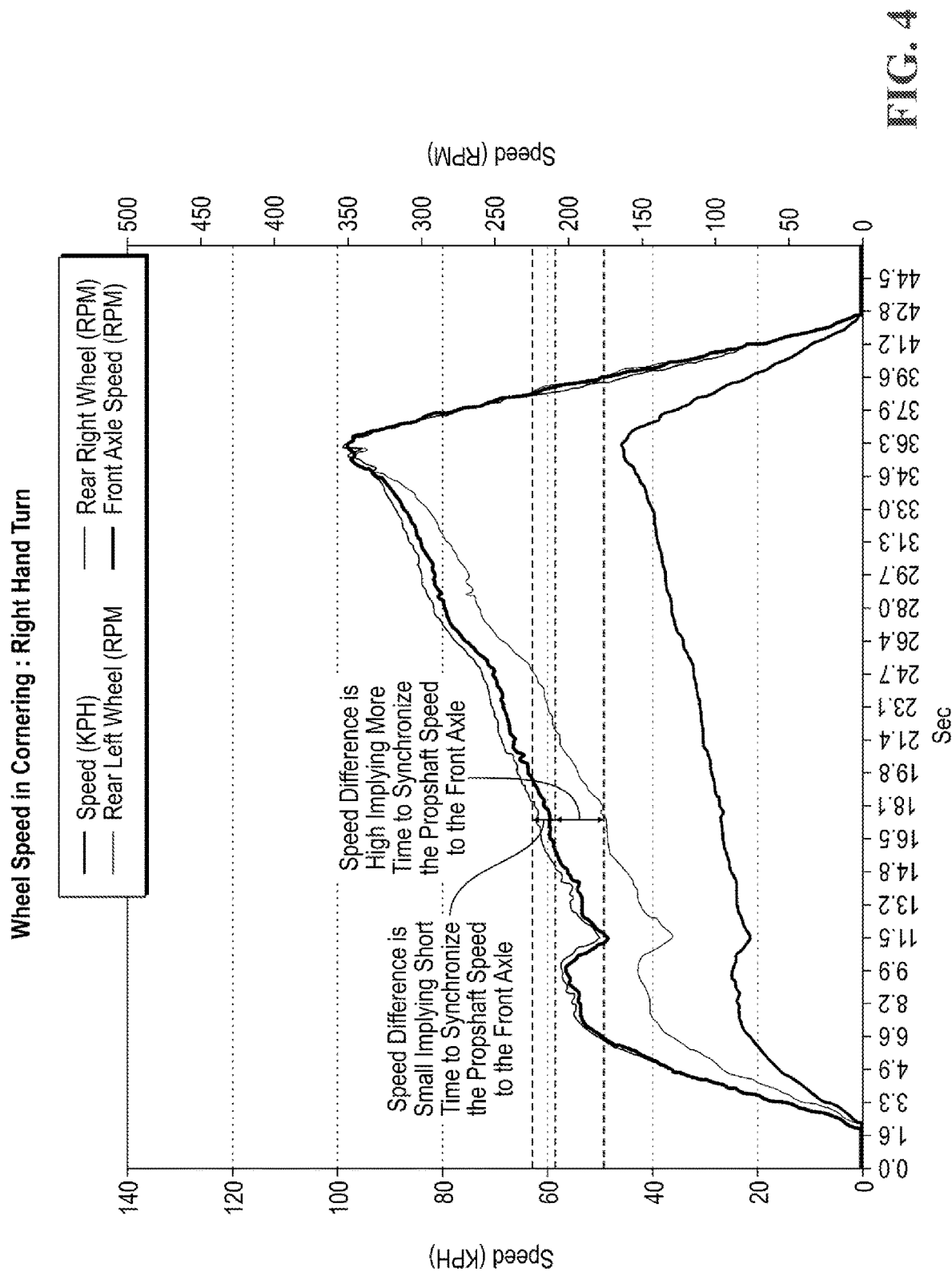
FIG. 4 is a series of graphs illustrating the speed differences between the wheels on the rear axle and the front axle at the propshaft during a right turn.

For example, FIG. 3 illustrates that the slip speed across the PTU clutch 34 will be smaller relative to the right drive wheel 18 on the rear axle 40 (as opposed to relative to the left drive wheel on the rear axle 40) when the vehicle 10 is making a left turn, and FIG. 4 illustrates that the slip speed across the PTU clutch 34 will be smaller relative to the left drive wheel 18 on the rear axle 40 (as opposed to relative to the right drive wheel on the rear axle 40) when the vehicle 10 is making a right turn. Therefore, it may be desirable to utilize the first RDU clutch 58 to connect the rear axle 40 to the front axle 36 via driveshaft 38 while the vehicle 10 is making a right turn, and to utilize the second RDU clutch 59 to connect the rear axle 40 to the front axle 36 via driveshaft 38 while the vehicle 10 is making a left turn. It should be noted that the slip speed across the PTU clutch 34 could be taken as the difference between the speed of the front axle 36 in the propshaft domain (i.e., the point at which the front axle 36 connects to and disconnects from the driveshaft 38, which may be the side of the PTU clutch 34 that is affixed to carrier 22) and the speed of the left drive wheel 18 on the rear axle 40, or could be taken as the difference between the speed of the front axle 36 in the propshaft domain and the speed of the right drive wheel 18 on the rear axle 40.

Figure 2:
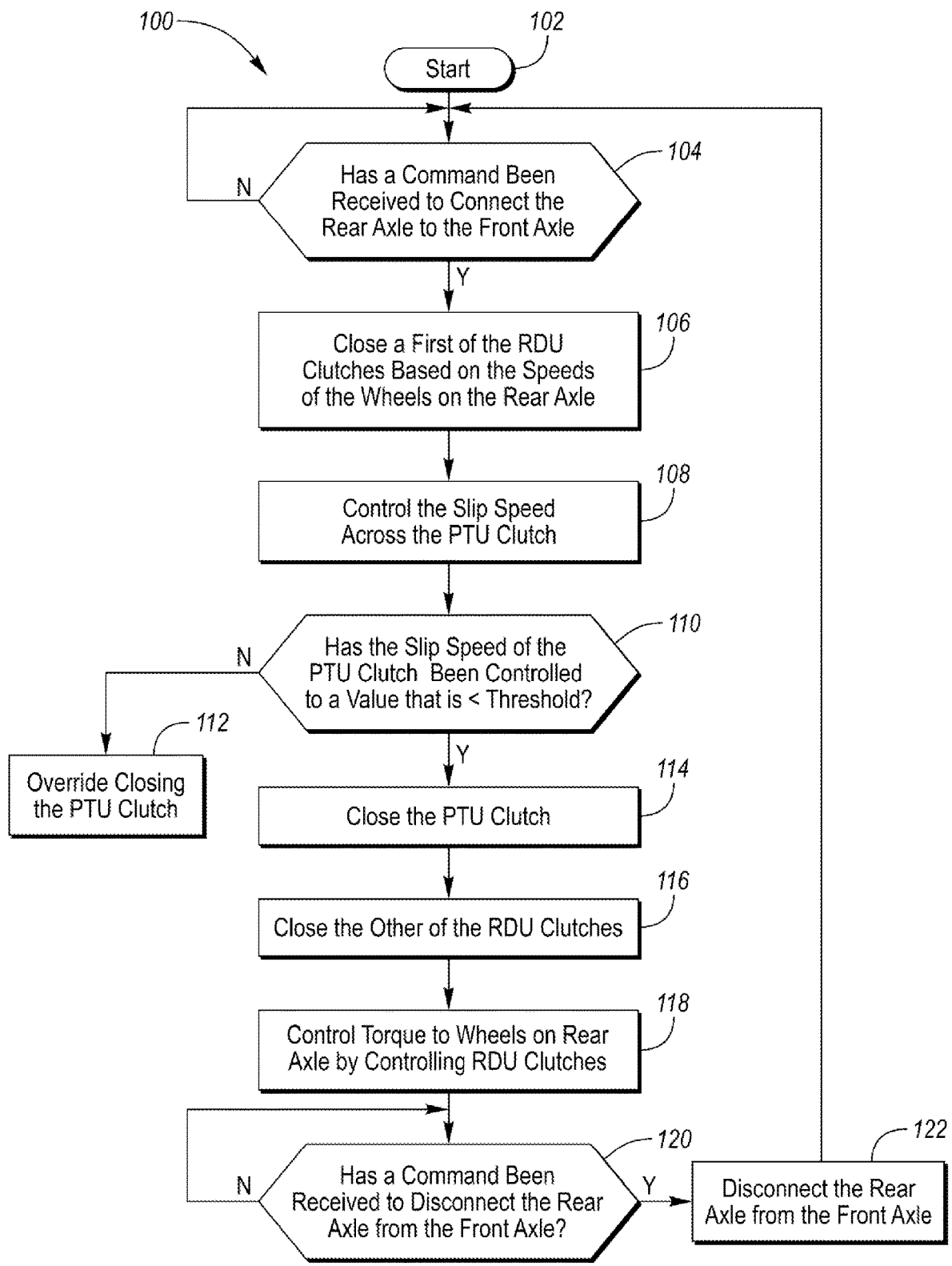
FIG. 2 is a flowchart illustrating a method of reconnecting a rear axle to a front axle.

Referring to FIG. 2, a flowchart of a method 100 of reconnecting the rear axle 40 to the powertrain 12, or more specifically, to the front axle 36 is illustrated. The method 100 may be stored as control logic and/or an algorithm within the controller 60. The controller 60 may implement the method 100 by controlling the various components of the vehicle 10. The method 100 may be utilized to control connecting the rear axle 40 to the front axle 36 based on the wheel speeds on the rear axle 40. The method 100 is initiated at start block 102. The method 100 may be initiated at start block 102 by turning a start key or ignition of the vehicle 10 to an "on" position.

The method 100 then moves on to block 104 where it is determined if a command has been received to connect the rear axle 40 to the front axle 36 via driveshaft 38. If the answer at block 104 is "NO," the method 100 recycles back to the beginning of block 104. If the answer at block 104 is "YES," the method 100 moves on to block 106 where one of the RDU clutches (i.e., either the first RDU clutch 58 or the second RDU clutch 59) is closed based on the wheel speeds on the rear axle 40. More specifically, the controller 60 may be configured to close either the first RDU clutch 58 or the second RDU clutch 59 at block 106 based on which of the drive wheels 18 on the rear axle 40 is moving at a greater speed. For example, if the left drive wheel 18 on the rear axle 40 is moving at a faster speed than the right drive 18 on the rear axle 40, the first RDU clutch 58 will be closed at block 106, or if the right drive wheel 18 on the rear axle 40 is moving at a faster speed than the left drive 18 on the rear axle 40, the second RDU clutch 59 will be closed at block 106. Closing either the first RDU clutch 58 or the second RDU clutch 59 will transfer loads from the rear axle 40 to the driveshaft 38 to increase a speed of the driveshaft 38.

The left drive wheel 18 on the rear axle 40 moving at a faster speed than the right drive wheel 18 on the rear axle 40 may be indicative that the vehicle is making a right turn such that the left drive wheel 18 on the rear axle 40 and the first RDU clutch 58 are an outer wheel and an outer clutch, respectively, relative to a turn radius, and such that the right drive wheel 18 on the rear axle 40 and the second RDU clutch 59 are an inner wheel and an inner clutch, respectively, relative to the turn radius. The right drive wheel 18 on the rear axle 40 moving at a faster speed than the left drive wheel 18 on the rear axle 40 may be indicative that the vehicle is making a left turn such that the right drive wheel 18 on the rear axle 40 and the second RDU clutch 59 are an outer wheel and an outer clutch, respectively, relative to a turn radius, and such that the left drive wheel 18 on the rear axle 40 and the first RDU clutch 58 are an inner wheel and an inner clutch, respectively, relative to the turn radius.

Alternatively, at block 106 the method 100 may be configured to selected closing either the first RDU clutch 58 or the second RDU clutch 59 if the speed difference between the drive wheels 18 on the rear axle 40 exceeds a threshold. For example, if the left drive wheel 18 on the rear axle 40 is moving at a faster speed than the right drive 18 on the rear axle 40 and the speed difference between the drive wheels 18 on the rear axle 40 exceeds the threshold, the first RDU clutch 58 will be closed at block 106, or if the right drive wheel 18 on the rear axle 40 is moving at a faster speed than the left drive 18 on the rear axle 40 and the speed difference between the drive wheels 18 on the rear axle 40 exceeds the threshold, the second RDU clutch 59 will be closed at block 106. On the other hand, if the speed difference between the drive wheels 18 on the rear axle 40 does not exceed the threshold, the controller 60 may select to close either the first RDU clutch 58 or the second RDU clutch 59 (i.e., there is no preference in selecting which RDU clutch to close at block 106 based on the speeds of the drive wheels 18 on the rear axle 40). Also, in any embodiment, if the speeds of the drive wheels 18 on the rear axle 40 are equal, the controller 60 may select to close either the first RDU clutch 58 or the second RDU clutch 59 (i.e., there is no preference in selecting which RDU clutch to close at block 106 based on the speeds of the drive wheels 18 on the rear axle 40).

Once either the first RDU clutch 58 or the second RDU clutch 59 is closed to transfer loads from the rear axle 40 to the driveshaft 38 to increase a speed of the driveshaft 38 at block 106, the method 100 moves on to block 108, where the slip across the PTU clutch 34 is controlled to within a desired range (e.g., the slip across the PTU clutch 34 is decreased to a value that is between ten rotations per minute and zero) by controlling the torque across which of the first RDU clutch 58 or the second RDU clutch 59 was closed at block 106. Controlling the torque across the first RDU clutch 58 or the second RDU clutch 59 may be accomplished by adjusting an engagement pressure of an actuator (e.g., actuator 68 or actuator 70), such as hydraulic cylinder, that is utilized to engage and disengage the first RDU clutch 58 or the second RDU clutch 59.

The method 100 then moves on to block 110 where it is determined if the slip across the PTU clutch 34 has been controlled to a value that is less than a threshold. If the answer at block 110 is "NO," the method 100 moves on to block 112 where the controller 60 overrides closing the PTU 34 clutch. The step at block 112 may ultimately result in the controller 60 overriding connecting the rear axle 40 to front axle 36, which may result in reopening the RDU clutch that was closed at block 106. If the answer at block 110 is "YES," the slip of the PTU clutch 34 has been controlled to within a desirable range that is less than the threshold of block 110 and the method 100 moves on to block 114. At block 114, the PTU clutch 34 is closed connecting the rear axle 40 to the front axle 36.

It should be noted that the step at block 110 may occur simultaneously with the step at block 108 and that the step at block 110 may be utilized to determine whether or not conditions are such that system is capable of controlling the slip of the PTU clutch 34 to within a range that is less than the threshold. The threshold may be value that is utilized to prevent damage to the PTU clutch 34. For example, if the PTU clutch 34 were to be closed at a slip speed that is greater than the threshold at block 110, the probability of damaging the PTU clutch 34 is increased to an undesirable level, and therefore the PTU clutch 34 is prevented from closing.

The method 100 then moves on to block 116, where the other of the first RDU clutch 58 and the second RDU clutch 59 (i.e., the RDU clutch that was not closed at block 106) is closed. Once the first RDU clutch 58, the second RDU clutch 59, and the PTU clutch 34 are all closed, the torque being delivered to each wheel 18 on the rear axle 40 may be controlled independently at block 118 by adjusting the torque of the first RDU clutch 58 and/or the torque of the second RDU clutch 59. More specifically, the torque being delivered to each wheel 18 on the rear axle 40 may be controlled independently by adjusting the engagement pressures of actuator 68 and/or actuator 70 to adjust the torque of the first RDU clutch 58 and/or the torque of the second RDU clutch 59, respectively.

The method 100 next moves onto block 120 where it is determined if a command has been received to disconnect the rear axle 40 to the front axle 36 via driveshaft 38. If the answer at block 120 is "NO," the method 100 recycles back to the beginning of block 118. If the answer at block 120 is "YES," the method 100 moves on to block 122 where the rear axle 40 is disconnected from the from axle 36 via opening the first RDU clutch 58, the second RDU clutch 59, and the PTU clutch 34. The method 100 then returns to the beginning of block 104.

It should be understood that the flowchart in FIG. 2 is for illustrative purposes only and that the method 100 should not be construed as limited to the flowchart in FIG. 2. Some of the steps of the method 100 may be rearranged while others may be omitted entirely. Furthermore, the method 100 may be executed several times, resulting in several connections and disconnects of the rear axle 40 to and from the front axle 36. It should also be understood that the designations of first, second, third, fourth, etc. for axles, clutches, differentials, gears, carriers, output shafts, half shafts, commands, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a first axle having a first differential and first clutch, the first differential including first and second output shafts coupled to first and second wheels, respectively;
   a second axle having a second differential, a second clutch, and a third clutch, the second differential including third and fourth output shafts coupled to third and fourth wheels, respectively, the second clutch configured to couple and decouple the third wheel to and from the third output shaft, and the third clutch configured to couple and decouple the fourth wheel to and from the fourth output shaft;
   a driveshaft selectively coupled to a carrier of the first differential by the first clutch and coupled to a carrier of the second differential via a fixed gearing arrangement; and
   a controller programmed to, in response to a command to connect the first axle to the second axle via the driveshaft and a speed of the third wheel being greater than a speed of the fourth wheel such that a difference between the speeds of the third and fourth wheels exceeds a threshold, close the second clutch to transfer loads from the second axle to the driveshaft to increase a speed of the driveshaft and close the first clutch subsequent to closing the second clutch.

2. The vehicle of claim 1, wherein the controller is further programmed to, in response to closing the second clutch and a resulting slip speed across the first clutch exceeding a second threshold, override closing the first clutch subsequent to closing the second clutch.

3. The vehicle of claim 1, wherein the controller is further programmed to, in response to closing the first clutch subsequent to closing the second clutch, close the third clutch subsequent to closing the first clutch.

4. The vehicle of claim 1, wherein the controller is further programmed to, adjust a slip speed of the first clutch to within a desired range prior to closing the first clutch and subsequent to closing the second clutch.

5. The vehicle of claim 1, wherein the controller is further programmed to,
   in response to the command to connect the first axle to the second axle via the driveshaft and the difference between the speeds of the third and fourth wheels being less than the threshold, close either the second clutch or the third clutch to transfer loads from the second axle to the driveshaft to increase a speed of the driveshaft and close the first clutch subsequent to closing either the second clutch or the third clutch, and close the other of the second clutch or the third clutch subsequent to closing the first clutch.

6. The vehicle of claim 1, wherein the third wheel is an outer wheel and the fourth wheel is an inner wheel relative to a turning radius.

7. The vehicle of claim 1, wherein the controller is further programmed to, in response to a second command to connect the first axle to the second axle via the driveshaft and the speed of the fourth wheel being greater than the speed of the third wheel such that the difference between the speeds of the third and fourth wheels exceeds the threshold, close the third clutch to transfer loads from the second axle to the driveshaft to increase the speed of the driveshaft and close the first clutch subsequent to closing the third clutch.

8. A vehicle comprising:
a first axle having first and second output shafts and first and second wheels;
a second axle having third and fourth output shafts and third and fourth wheels;
a driveshaft selectively coupled to the first axle via a first clutch and coupled to the second axle via a fixed gearing arrangement;
a second clutch configured to couple and decouple the third wheel to and from the third output shaft;
a third clutch configured to couple and decouple the fourth wheel to and from the fourth output shaft; and
a controller programmed to, in response to a command to connect the first axle to the second axle via the driveshaft and a speed of the third wheel being greater than a speed of the fourth wheel, close the second clutch to transfer loads from the second axle to the driveshaft to increase a speed of the driveshaft and close the first clutch subsequent to closing the second clutch.

9. The vehicle of claim 8, wherein the controller is further programmed to, in response to closing the second clutch and a resulting slip speed across the first clutch exceeding a threshold, override closing the first clutch subsequent to closing the second clutch.

10. The vehicle of claim 8, wherein the controller is further programmed to, in response to closing the first clutch subsequent to closing the second clutch, close the third clutch subsequent to closing the first clutch.

11. The vehicle of claim 8, wherein the controller is further programmed to, adjust a slip speed of the first clutch to within a desired range prior to closing the first clutch and subsequent to closing the second clutch.

12. The vehicle of claim 8, wherein the controller is further programmed to,
in response to the command to connect the first axle to the second axle via the driveshaft and a difference between the speeds of the third and fourth wheels being less than a threshold, close either the second clutch or the third clutch to transfer loads from the second axle to the driveshaft to increase a speed of the driveshaft and close the first clutch subsequent to closing either the second clutch or the third clutch, and
close the other of the second clutch or the third clutch subsequent to closing the first clutch.

13. The vehicle of claim 8, wherein the third wheel is an outer wheel and the fourth wheel is an inner wheel relative to a turning radius.

14. The vehicle of claim 8, wherein the controller is further programmed to, in response to a second command to connect the first axle to the second axle via the driveshaft and the speed of the fourth wheel being greater than the speed of the third wheel, close the third clutch to transfer loads from the second axle to the driveshaft to increase the speed of the driveshaft and close the first clutch subsequent to closing the third clutch.

15. A vehicle comprising:
a first axle;
a second axle having first and second half shafts and having first and second wheels;
a driveshaft disposed between the first and second axles and coupled to the second axle;
a first clutch configured to selectively couple the driveshaft to the first axle;
a second clutch configured to selectively couple the first wheel to the first half shaft;
a third clutch configured to selectively couple the second wheel the second half shaft; and
a controller programmed to,
in response to a first command to connect the first axle to the second axle via the driveshaft and a speed of the first wheel being greater than a speed of the second wheel, close the second clutch to transfer loads from the second axle to the driveshaft to increase a speed of the driveshaft and close the first clutch subsequent to closing the second clutch, and
in response to a second command to connect the first axle to the second axle via the driveshaft and a speed of the second wheel being greater than a speed of the first wheel, close the third clutch to transfer loads from the second axle to the driveshaft to increase a speed of the driveshaft and close the first clutch subsequent to closing the third clutch.

16. The vehicle of claim 15, wherein the controller is further programmed to, in response to closing the second clutch and a resulting slip speed across the first clutch exceeding a threshold, override closing the first clutch subsequent to closing the second clutch.

17. The vehicle of claim 15, wherein the controller is further programmed to, in response to closing the third clutch and a resulting slip speed across the first clutch exceeding a threshold, override closing the first clutch subsequent to closing the third clutch.

18. The vehicle of claim 15, wherein the controller is further programmed to,
in response to the first command to connect the first axle to the second axle via the driveshaft and a difference between the speeds of the third and fourth wheels being less than a threshold, close either the second clutch or the third clutch to transfer loads from the second axle to the driveshaft to increase a speed of the driveshaft and close the first clutch subsequent to closing either the second clutch or the third clutch, and
close the other of the second clutch or the third clutch subsequent to closing the first clutch.

19. The vehicle of claim 15, wherein the controller is further programmed to, adjust a slip speed of the first clutch to within a desired range prior to closing the first clutch.

20. The vehicle of claim 15, wherein the second axle is a rear axle.

* * * * *